US012557924B2

(12) United States Patent
Novak

(10) Patent No.: US 12,557,924 B2
(45) Date of Patent: Feb. 24, 2026

(54) METHOD AND SYSTEM FOR GONDOLA ALIGNMENT

(71) Applicant: Ronald Kevin Novak, LaGrange, OH (US)

(72) Inventor: Ronald Kevin Novak, LaGrange, OH (US)

( * ) Notice: Subject to any disclaimer, the term of this patent is extended or adjusted under 35 U.S.C. 154(b) by 554 days.

(21) Appl. No.: 18/113,604

(22) Filed: Feb. 23, 2023

(65) Prior Publication Data

US 2023/0200565 A1 Jun. 29, 2023

Related U.S. Application Data

(63) Continuation of application No. 17/537,374, filed on Nov. 29, 2021, now Pat. No. 11,602,230.

(51) Int. Cl.
*A47F 5/10* (2006.01)
*B25B 21/00* (2006.01)

(52) U.S. Cl.
CPC ............ *A47F 5/103* (2013.01); *B25B 21/007* (2013.01)

(58) Field of Classification Search
CPC ......... A47F 5/103; B25B 21/007; B25H 7/00; A47B 91/022; B44D 3/38
See application file for complete search history.

(56) References Cited

U.S. PATENT DOCUMENTS 1,624,684 A 4/1927 Smith
2,680,302 A 6/1954 Standal
2,767,483 A 10/1956 Sauer, Jr.
3,675,735 A 7/1972 Bailey
4,438,538 A 3/1984 Larsen
4,457,078 A 7/1984 Suchy
4,648,185 A 3/1987 Brandimarte
5,138,771 A 8/1992 Lee
5,148,605 A 9/1992 Julia
5,735,512 A 4/1998 Waddell
6,148,529 A 11/2000 Kennedy
6,223,446 B1 5/2001 Potter
6,678,961 B1 1/2004 Panahi
6,678,967 B1 1/2004 Jueneman
(Continued)

OTHER PUBLICATIONS

"Restriction Requirement for U.S. Appl. No. 17/537,374", Mailed Date: Jul. 1, 2022, 6 pages.
(Continued)

*Primary Examiner* — Yaritza Guadalupe-Mccall
(74) *Attorney, Agent, or Firm* — CALFEE, HALTER & GRISWOLD LLP

(57) ABSTRACT

A leveling assembly including a levelling bit with a first portion that engages a screw head of a levelling screw in a base of a gondola assembly and a second portion that countersinks around a portion of the leveling screw. The levelling assembly further includes an alignment measuring system configured to measure alignment of slots in the gondola assembly. The alignment measuring system includes a first bar attached to a retractable cord and a second bar movable along the cord. The first bar is shaped for insertion into a first slot of a first upright and the second bar is shaped for insertion into a second slot of a second upright. The cord is shaped to extend along a face of a third upright between the first and second upright when the first bar is inserted into the first slot and the second bar is inserted into the second slot.

20 Claims, 7 Drawing Sheets

(56) References Cited

U.S. PATENT DOCUMENTS

| | | | | |
|---|---|---|---|---|
| 6,826,845 | B2 | 12/2004 | Pritchard | |
| 6,964,109 | B1 | 11/2005 | Bond | |
| 7,028,411 | B1 | 4/2006 | Kasche | |
| 7,210,243 | B2 | 5/2007 | Schmidt et al. | |
| 7,409,771 | B2 | 8/2008 | Bond | |
| 7,497,023 | B1 | 3/2009 | Simmons et al. | |
| 8,347,518 | B1 | 1/2013 | Martinez | |
| 8,732,969 | B2 | 5/2014 | Erestam et al. | |
| 8,739,423 | B1 * | 6/2014 | Cortum | G01C 9/28 33/613 |
| 9,067,314 | B2 | 6/2015 | Frazer | |
| 10,844,604 | B2 | 11/2020 | Folkersen et al. | |
| 10,844,611 | B2 | 11/2020 | Franklin et al. | |
| 11,064,823 | B2 | 7/2021 | Ulloa et al. | |
| 11,116,317 | B2 | 9/2021 | LeBlanc | |
| 11,602,230 | B1 * | 3/2023 | Novak | B25B 21/007 |
| 12,185,851 | B2 * | 1/2025 | Cox | A47G 1/205 |
| 2003/0154614 | A1 | 8/2003 | Rice | |
| 2004/0049936 | A1 | 3/2004 | Newman | |
| 2008/0256813 | A1 | 10/2008 | Merryfield | |
| 2023/0200565 | A1 * | 6/2023 | Novak | B25H 7/00 211/206 |

OTHER PUBLICATIONS

"Response to Restriction Requirement for U.S. Appl. No. 17/537,374", Filed Date: Oct. 3, 2022, 2 pages.

"Notice of Allowance and Fees Due for U.S. Appl. No. 17/537,374", Mailed Date: Nov. 2, 2022, 9 pages.

"Amendment Under 37 C.F.R. 1.312 for U.S. Appl. No. 17/537,374", Filed Date: Feb. 2, 2023, 6 pages.

"Corrected Notice of Allowability for U.S. Appl. No. 17/537,374", Mailed Date: Feb. 8, 2023, 5 pages.

* cited by examiner

METHOD AND SYSTEM FOR GONDOLA ALIGNMENT

RELATED APPLICATION

This application is a continuation of U.S. patent application Ser. No. 17/537,374, filed on Nov. 29, 2021, and entitled "METHOD AND SYSTEM FOR GONDOLA ALIGNMENT", the entirety of which is incorporated herein by reference.

BACKGROUND

Gondola assemblies comprise a plurality of spaced uprights that are used to support items placed thereon, such as via shelves that are attached to slots on the uprights. It is desirable for the shelving unit to be level in order to retain items thereon and/or to provide a pleasing aesthetic for a store layout. Accordingly, the slots of adjacent uprights need to be aligned in order to support a level shelf therebetween.

Conventionally, aligning the slots is a time consuming and labor-intensive process that involves rotating a levelling screw(s) in a base of each upright. In order to support the weight placed on the upright of a gondola assembly, a large metal base is used for each of the uprights. Due to the size and shape of the conventional base, access to the levelling screw is limited to either a foot of the levelling screw that is in contact with the ground or a screw head accessible through a tunnel with a diameter similar to an outer diameter of the screw thread of the levelling screw.

In order to adjust the levelling screw, the user is limited to two difficult and time-consuming processes. In a first process a user bends down and uses a crescent wrench to rotate the foot of the levelling screw while dealing with the weight of the upright and the base pressing down on the foot of the levelling screw. In a second process, the user again bends down and inserts a screwdriver (or equivalent) into the tunnel to engage the screw head of the levelling screw. Because of the position of the screw head in the tunnel and the weight of the upright and the base pressing down on the levelling screw while the user attempts to rotate it, it is difficult to maintain the proper connection between the head of the screwdriver and the screw head of the levelling screw.

Moreover, determining how much to rotate (if any) the levelling screw to adjust the position of the upright is again a time-consuming process. Conventionally, a user inserts a first wrench (or equivalent) into a first slot of a first upright and then inserted a second wrench (or equivalent) into a second slot of a second upright that is the same relative position on the upright as the first slot on the first upright. The user then wraps a rope or string around the first wrench, walks the rope down to the second wrench, and tightens the rope to create a straight line between the first wrench and the second wrench while tying the rope to the second wrench and preventing the rope from untying at the first wrench.

Having to constantly tie and untie the rope in order to level each gondola assembly while also bending down to adjust the levelling screw(s) makes assembling gondolas for a store difficult and time-consuming because the store can have dozens to over 100 different gondola assemblies arranged therein. Further, the constant standing up to check the alignment and bending down to adjust the levelling screw is detrimental to the user.

SUMMARY

The following is a brief summary of subject matter that is described in greater detail herein. This summary is not intended to be limiting as to the scope of the claims.

In an exemplary embodiment, described herein is a levelling assembly for aligning slots in a gondola assembly. The levelling assembly includes a levelling bit configured to engage a levelling screw in a base of the gondola assembly. The levelling bit can include a first portion that engages a screw head of the levelling screw and a second portion that countersinks around a portion of the leveling screw when the first portion engages the screw head.

The levelling assembly further includes an alignment measuring system configured to measure alignment of slots in the gondola assembly. The alignment measuring system comprises a first bar attached to a retractable cord and a second bar movable along the retractable cord. A portion of the first bar is shaped for insertion into a first slot of a first upright of the gondola assembly and a portion of the second bar is shaped for insertion into a second slot of a second upright of the gondola assembly. The cord is shaped to extend along a face of a third upright located between the first upright and the second upright when the first bar is inserted into the first slot and the second bar is inserted into the second slot. The position of the cord on the face of the third upright relative to a slot on the third upright can be used to determine how much (if any) to rotate the levelling screw via the levelling bit.

The above-described technologies present various advantages over conventional levelling techniques for gondola assemblies. Conventional levelling techniques involving inserting wrenches into slots in gondola assemblies and manually tying a cord at a first wrench and walking the rope to a second wrench and tying the cord taut at the second wrench such that the cord is level. The conventional systems require the user to bend down to either rotate the foot of the levelling screw via a wrench or insert a screwdriver into a tunnel in the base to rotate the screw head of the levelling screw. In contrast, the technologies described herein permit a user to quickly measure slot alignment by stretching a retractable cord between uprights in the gondola assembly. The technologies further permit a user to quickly rotate the levelling screw via a levelling bit that countersinks around the levelling screw to maintain contact with the levelling screw. The levelling bit is connected to an extender and a drill such that a user need not bend down to adjust a position of the upright.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
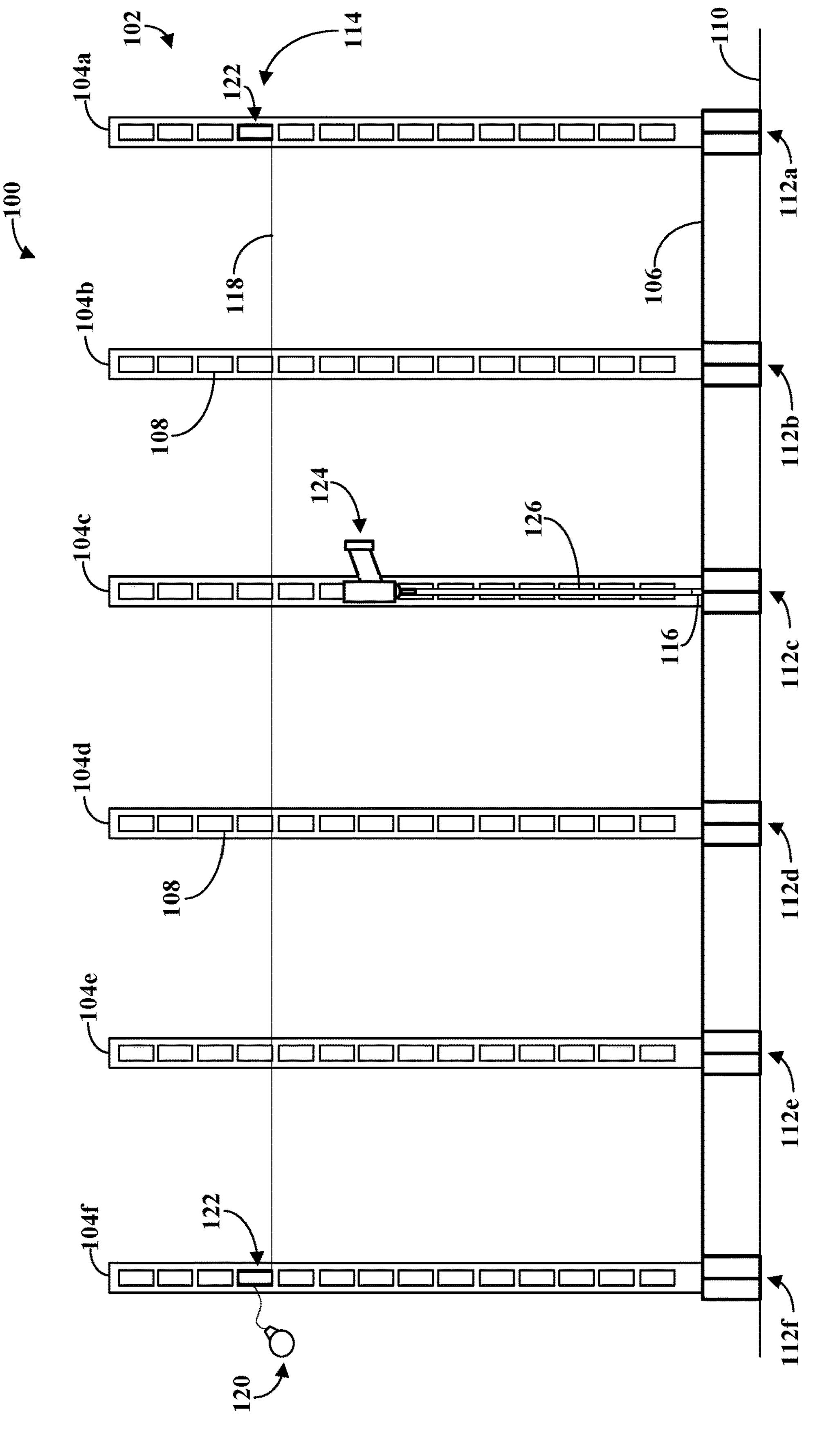
FIG. 1 illustrates an exemplary levelling assembly for a gondola assembly.

Various technologies pertaining to aligning gondola uprights in a gondola assembly are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an assembly for aligning uprights of a gondola assembly. The assembly includes an alignment measuring system that stretches a retractable cord across one or more of the uprights in the gondola assembly. The alignment measuring system includes a first bar to secure the cord to a first upright and a second bar to secure the cord to a second upright and thus stretching the cord across a third upright between the first upright and second upright. The assembly further includes a levelling bit that engages a levelling screw in a base of the gondola assembly to adjust a position of the first, second, and/or third upright. The levelling bit is shaped to maintain engagement with the levelling screw when a user rotates the levelling bit. The levelling bit is further shaped for attachment to an extender that is attached to a drill.

Turning to FIG. 1, illustrated is one embodiment of a levelling assembly 100 for aligning one or more gondola uprights in a gondola assembly 102. The gondola assembly 102 can include any suitable number of uprights that are connected together, and the number may vary depending on the arrangement. For instance, a first gondola assembly may include 3 uprights connected to together while a second gondola assembly includes 10 uprights connected together. In the illustrated embodiment in FIG. 1, the gondola assembly 102 comprises six uprights 104*a-f* which are connected together via a bottom rail(s) 106. Each of the uprights 104*a-f* are spaced apart and arranged to stand vertically in a straight line, where the uprights 104*a*-4 are positioned along a horizontal line that extends from the first upright 104*a* to the sixth upright 104*f*. In one embodiment, the bottom rail 106 may comprise a singular rail that extends from the first upright 104*a* to the sixth upright 104*f* connecting the uprights 104*a-f* together. In another embodiment, the bottom rail 106 comprises a plurality of rails, where one of the structures connects adjacent uprights together, e.g., the first upright 104*a* and the second upright 104*b*.

The uprights 104*a-f* further include one or more slots 108 located on a face of each upright. In the illustrated embodiments, the uprights 104*a-f* include a similar number of slots 108; however, the number may vary for one or more of the uprights 104*a-f*. The slots 108 are sized to receive a connector for a shelving unit (not pictured). The shelving unit can extend between two uprights, such as two adjacent uprights. It is desirable for the shelving unit to be level in order to retain items thereon and/or to provide a pleasing aesthetic for the store layout. To that end, the slots 108 of the corresponding uprights for the shelving unit should be level with one another.

The gondola assembly 102 includes one or more bases that determine an alignment of an upright and/or a height above ground 110 of a slot in that upright. In the illustrated embodiment, each upright 104*a-f* includes a respective base 112*a-f* that defines an alignment of the corresponding upright and a height above ground 110 of the slots 108 in the upright. In another embodiment, a base is shared by a plurality of uprights. A base (e.g., the first base 112*a*) includes one or more levelling screws that rest on the ground and are threaded in the base. By rotating a levelling screw, a user can adjust the height of the base above the ground 110 and by extension a height of the corresponding upright attached to the base. The levelling screws can be arranged such that a first levelling screw is located adjacent a first side of the upright and a second levelling screw is located adjacent an opposing second side of the upright. By arranging levelling screws on opposing sides of the upright, a user can adjust an alignment of the upright by selectively turning the first levelling screw and/or the second levelling screw.

Conventionally, in order to support the weight placed on the upright (e.g., the shelving unit(s), items placed on the shelving unit(s), and/or items hung on the gondola assembly), a large metal base is used. Due to the size and shape of the conventional base, access to the levelling screw is limited to either a foot of the levelling screw that is in contact with the ground or a screw head accessible through a tunnel with a diameter similar to an outer diameter of the screw thread of the levelling screw. Thus, as noted above, in order to adjust the levelling screw to adjust the position of the upright, the user is limited to two difficult and time-consuming processes. In a first process a user bends down and uses a crescent wrench to rotate the foot of the levelling screw while dealing with the weight of the upright and the base pressing down on the foot of the levelling screw. In a second process, the user again bends down and inserts a screwdriver (or equivalent) into the tunnel to engage the screw head of the levelling screw. Because of the position of the screw head in the tunnel and the weight of the upright and the base pressing down on the levelling screw while the user attempts to rotate it, it is difficult to maintain the proper connection between the head of the screwdriver and the screw head of the levelling screw.

Moreover, determining how much to rotate (if any) the levelling screw to adjust the position of the upright is additionally a time-consuming process. Conventionally, a user inserts a first wrench (or equivalent) into a first slot of a first upright and then inserts a second wrench (or equivalent) into a second slot of a second upright that is the same relative position on the upright as the first slot on the first upright. The user then wraps a rope or string around the first wrench, walks the rope down to the second wrench, and tightens the rope to create a straight line between the first wrench and the second wrench while tying the rope to the second wrench and preventing the rope from untying at the first wrench.

In contrast to conventional system described above, the levelling assembly 100 described herein permits for rapid alignment determination and adjustment of the levelling screw(s) without having to constantly bend down and stand-up. The levelling assembly 100 includes an alignment measuring system 114 and a levelling bit 116 configured to engage a levelling screw, as will be described in detail below. The alignment measuring system 114 is configured to extend a retractable cord 118 from a first upright to a second upright in the gondola assembly 102. The non-extended portion(s) of the cord 118 can be retained in a housing 120. By retaining the non-extended portion(s) of the cord 118 within the housing 120, the alignment measuring system 114 provides a compact measuring system as compared to the conventional system which requires multiple separate parts.

In the illustrated embodiment, the alignment measuring system 114 extends the cord 118 from the first upright 104*a* to the sixth upright 104*f*. In another embodiment, the alignment measuring system 114 extends less cord, such as extending the cord 118 from the first upright 104*a* to the third upright 104*c*. By retaining the non-extended portion(s) in the housing 120, the alignment measuring system 114 need not require different cord lengths for different gondola assembly sizes and/or find somewhere to store extraneous rope when a long cord is used on smaller gondola assemblies. By extending the cord 118 from the first upright 104*a* to the sixth upright 104*f*, the alignment measuring system 114 also extends the cord 118 across a face of the other uprights 102*b-e*. Accordingly, a user is able to align all of the uprights 104*a-f* simultaneously.

The alignment measuring system 114 further includes one or more bars 122 that are retained on the cord 118. In the illustrated embodiment, the alignment measuring system 114 includes two bars 122; however, any suitable number of bars 122 may be provided, e.g., three or more. Each bar 122 includes a portion configured for insertion and retention in the slot 108 of an upright. For instance, a first portion can be milled or machined to have a thickness that is smaller than a width of the slot 108 while a second portion has a thickness larger than the width of the slot 108. In another example, the bar 122 has a uniform thickness that is smaller than a width of the slot 108.

In one embodiment, the bars 122 can have fixed positions along a length of the cord 118. In another embodiment, the bars 122 are movable along a length of the cord. In a further embodiment, a portion of the bars 122 have a fixed position along a length of the cord while a second portion of the bars 122 are movable along the length of the cord. In the illustrated embodiment, one bar 122 has a fixed position while a second bar 122 is movable along the length of the cord 118. Moreover, the bars 122 may be secured on the cord 118 to prevent removal and/or one or more of the bars 122 may be removable.

Subsequent to aligning the gondola assembly 102, the bars 122 can be removed from the slots 108 and the cord 118 can be wound back into the housing 120. In one embodiment, the alignment measuring system 114 includes a mechanism that automatically retracts a portion of the cord 118 back into the housing 120. In another embodiment, the alignment measuring system 114 includes a mechanism to manually retract a portion of the cord 118 back into the housing 120.

As mentioned above, the levelling assembly 100 includes the levelling bit 116 that extends through the tunnel in the base to engage the levelling screw. The levelling bit 116 includes a first end that is configured to engage a screw head of the levelling screw. The levelling bit 116 further includes a second end that is shaped for operable connection to a device that rotates the levelling bit 116. For example, as illustrated in FIG. 1, the levelling bit 116 can be operably connected to an electrical drill 124 via an extender 126. By using the extender 126, the levelling assembly 100 permits a user to remain standing while adjusting the levelling screw.

The levelling assembly 100 can include any suitable number of levelling bits 116. Each levelling bit 116 can include a corresponding extender and/or rotation mechanism (e.g., drill). In one example, the levelling assembly 100 includes two levelling bits to engage levelling screws on opposing sides of an upright to simultaneously rotate the levelling screws to adjust the upright.

Figure 2:
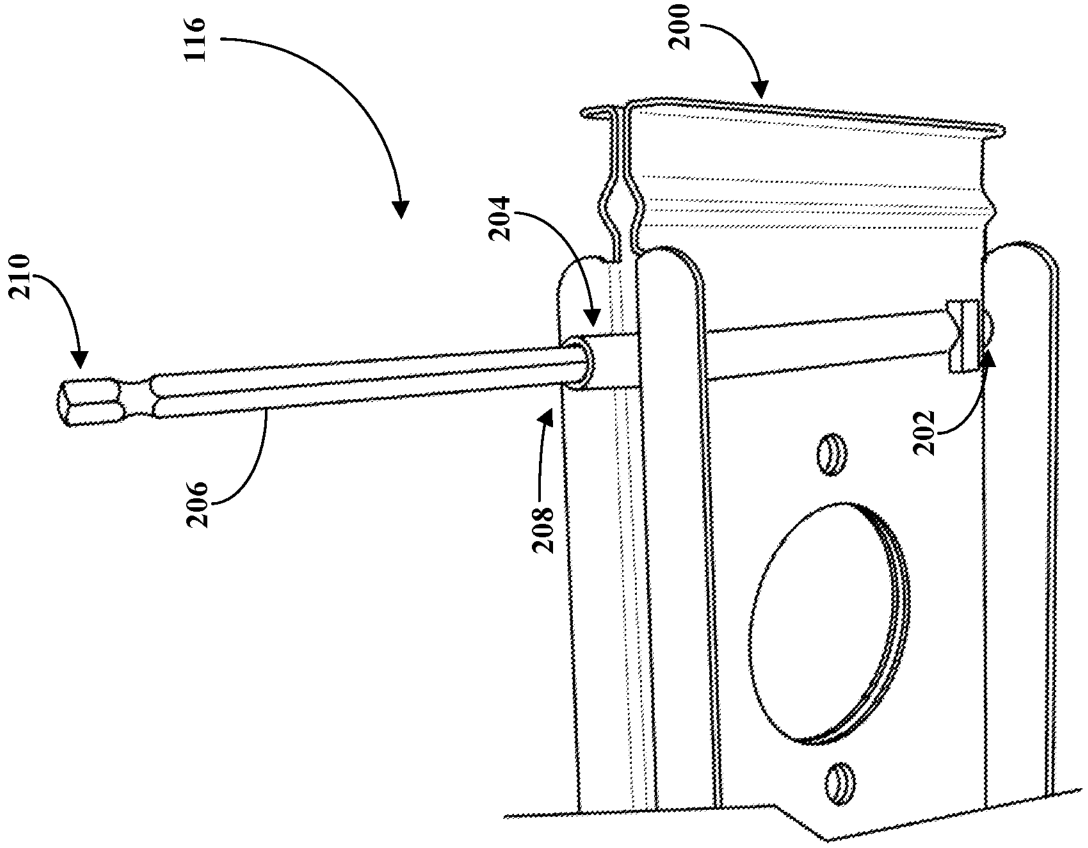
FIG. 2 illustrates an exemplary levelling bit inserted into a base of a gondola assembly.

Turning now to FIG. 2, illustrated is an embodiment of a levelling bit 116 passing through a base 200 to engage a levelling screw 202 therein. The illustrated embodiment of the levelling bit 116 comprises a plurality of sections. Namely, the illustrated levelling bit 116 includes a first section 204 and a second section 206 that are connected together; however, the levelling bit 116 can comprise any suitable number of sections. In the illustrated embodiment, the first section 204 comprises a hollow tube and the second section 206 is inserted into the first section 204 and held therein; however, the first section 204 and the second section 206 can be attached in any suitable manner.

The sections of the levelling bit 116 can comprise any suitable material. For instance, the first section 204 and the second section 206 can comprise similar material. In another example, the first section 204 can comprise a first material and the second section 206 can comprise a different second material. In one embodiment, the first section 204 can comprise brass while the second section 206 comprises a steel alloy.

The first section 204 includes a first end that engages the screw head of the levelling screw 202 and an opposing second end 208 configured to receive an end of the second section 206. The second section 206 further includes an end 210 configured to engage an extender.

The first section 204 and/or the second section 206 can be configured to engage in a locking relationship such that rotation of the second section 206 causes rotation of the first section 204, and by extension the levelling screw. In an embodiment, the second section 206 includes a polygonal cross-section and the first section 204 includes corresponding structure that engages the polygonal cross-section. In the illustrated embodiment, the second section 206 has a triangular cross-section and the first section 204 can include corresponding structure that engages one or more sides of the triangular cross-section. For instance, an interior surface of the first section 204 is machined to have a cross-section that engages one or more sides of the polygonal second section 206. In another embodiment, an exterior of the first section 204 is clamped or crimped causing a portion of the wall of the first section 204 to bend and engage a side(s) of the polygonal second section 206. In a further embodiment, a combination of an interior surface of the first section 204 is machined to engage the polygonal second section 206 and crimping an exterior of the first section 204 is used to hold the first section 204 and the second section 206 for joint rotation.

Figure 3:
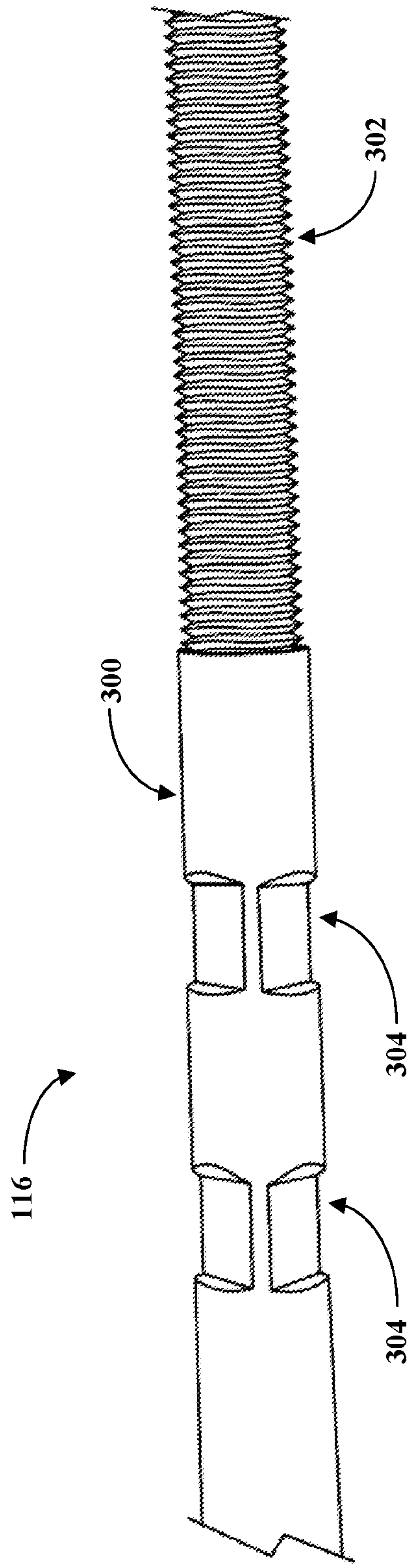
FIG. 3 illustrates another exemplary levelling bit engaging a levelling screw.

Turning now FIG. 3, illustrated is an embodiment of a levelling bit 116 where an exterior of a first section 300 has been crimped to engage a second section (not pictured). The illustrated levelling bit 116 is further shown engaging a levelling screw 302. The illustrated first section 300 of the levelling bit 116 includes a plurality of crimped sections 304 to hold the second section within the first section 300.

In contrast to conventional screwdrivers that merely engage the screw head of the levelling screw via a tip of the screwdriver and frequently lose the connection and strip the screw head, the illustrated levelling bit 116 is configured to receive and surround the head of the levelling screw 300 to maintain engagement. More particularly, by shaping the first section 300 such that a portion of the levelling screw 302 is inserted into the first section 300 when the levelling bit 116 engages the screw head of the levelling screw 302, the levelling bit 116 can maintain the connection with the levelling screw 302 during rotation.

Figure 5:
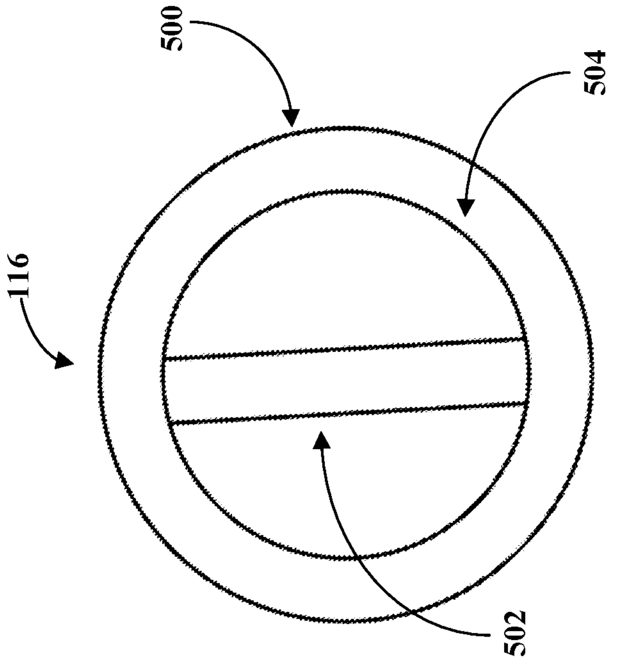
FIG. 5 illustrates another exemplary levelling bit.
Figure 4:
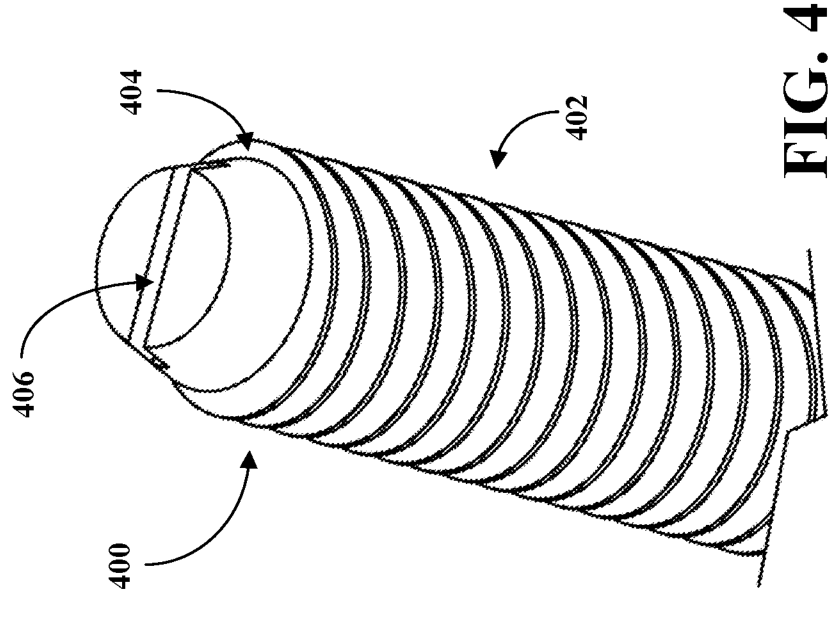
FIG. 4 illustrates another exemplary levelling screw.

Turning now to FIGS. 4 and 5, illustrated is an embodiment of a levelling screw 400 and an end 500 of a levelling bit 116 configured to engage the levelling screw 400, respectively. As can be seen in FIG. 4, the leveling screw 400 includes a threaded exterior surface 402 configured to engage corresponding threads in a base in a gondola assembly. The levelling screw 400 further includes a screw head 404 that includes an indentation 406 configured to receive a corresponding protrusion from the levelling bit 116 to allow a user to rotate the levelling screw 400. In the illustrated embodiment, the indentation 406 comprises a linear indentation that extends an entire diameter of the screw head; however, the indentation 406 can take any suitable shape, such as a crosshead and/or the like.

As seen in FIG. 5, the end 500 of the levelling bit 116 includes a protrusion 502 configured to engage the indentation 406 of the levelling screw 400. As discussed above, the end 500 of the levelling bit 116 is further machined to engage and surround a portion of the levelling screw 400. In the illustrated embodiment, the end 500 includes an interior surface portion that is angled resulting in a beveled edge 504 that is shaped to surround and engage the screw head 404.

Figure 6:
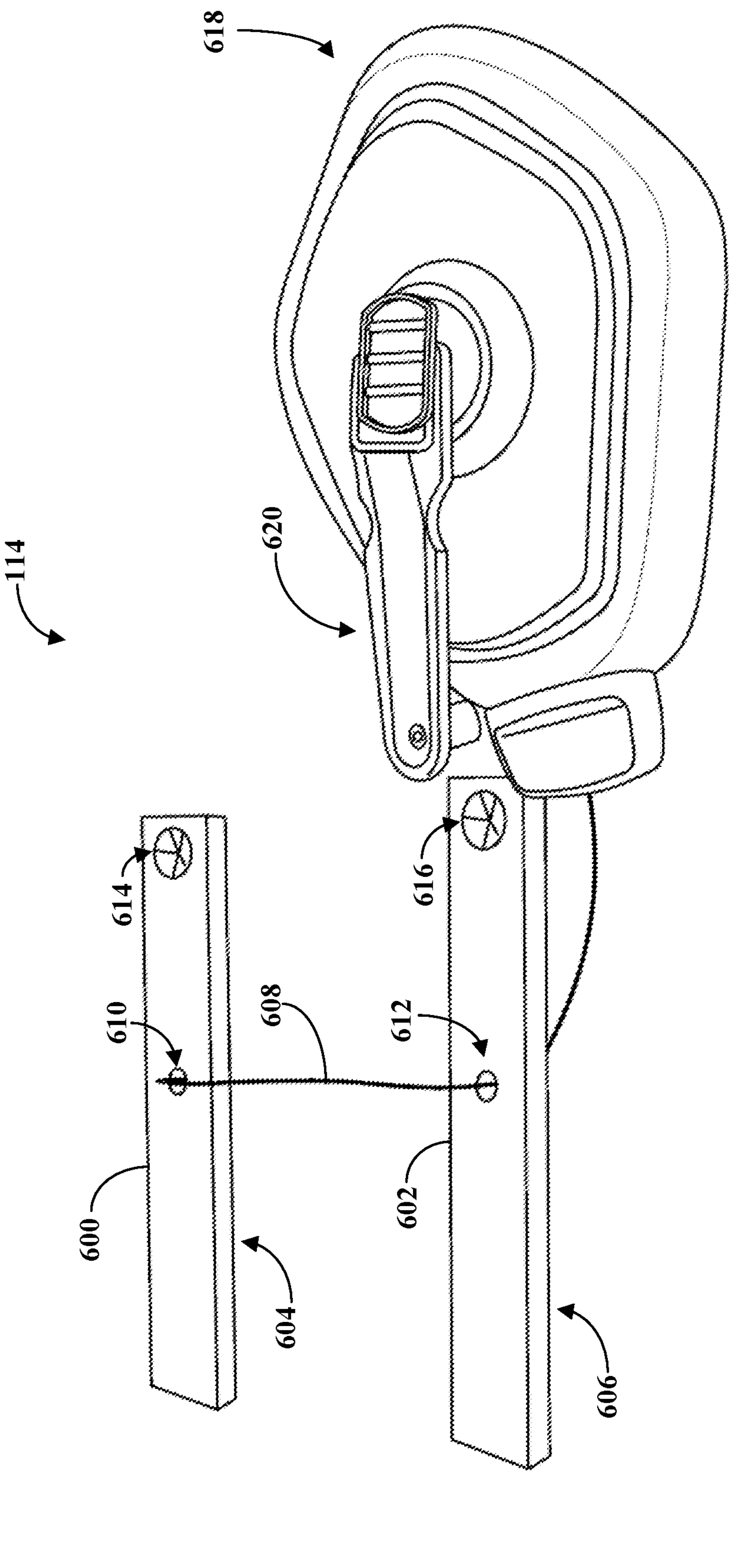
FIG. 6 illustrates an exemplary alignment measuring system.

Turning now to FIG. 6, illustrated is an embodiment of bars 600 and 602 of an alignment measuring system 114. As discussed above, each of the bars 600 and 602 include a portion 604 and 606, respectively, shaped for insertion into slots in a gondola assembly. The bars 600 and 602 further include attachment structure for affixing the bars 600 and 602 to a cord 608 of the alignment measuring system 114. In the illustrated embodiment, the attachment structure comprises a hole 610 and 612 drilled through each of the respective bars 600 and 602 shaped to receive the cord 608. In order to prevent an edge of a hole (e.g., hole 610) from unintentionally severing the cord 608, the edge of the hole can be machined to have a beveled edge.

As mentioned above, the bars 600 and 602 can be movably secured on the cord 608 and/or fixed at a specific position on the cord 608. In the embodiment illustrated in FIG. 6, the bar 600 is fixed at a specific position on the cord 608 and the bar 602 is movably secured on the cord 608. In the illustrated embodiment, the bar 600 is secured at an end of the cord 608 by looping the cord 608 through the hole 610 and around a portion of the bar 608; however, any suitable technique can be used for fixing a bar at a specific position on the cord 608.

The bars 600 and 602 may additionally include gripping portion to assist a user in handing the bars 600 and 602 during attachment to and/or removal from the gondola assembly. For instance, in the illustrated embodiment, the bars 600 and 602 include an indentation 614 and 616, respectively, machined thereon. In another embodiment, the gripping portion may comprise a countered surface machined on the bar, a rubberized surface attached to the bar, and/or the like.

As discussed above, the alignment measuring system 114 further includes a housing to retain non-extended portions of the cord 608. In the illustrated embodiment, the housing comprises a chalk line tool 618. The chalk line tool 618 includes a handle 620 attached thereto that rotates to retract the cord 608 back into the chalk line tool 618.

Figure 7:
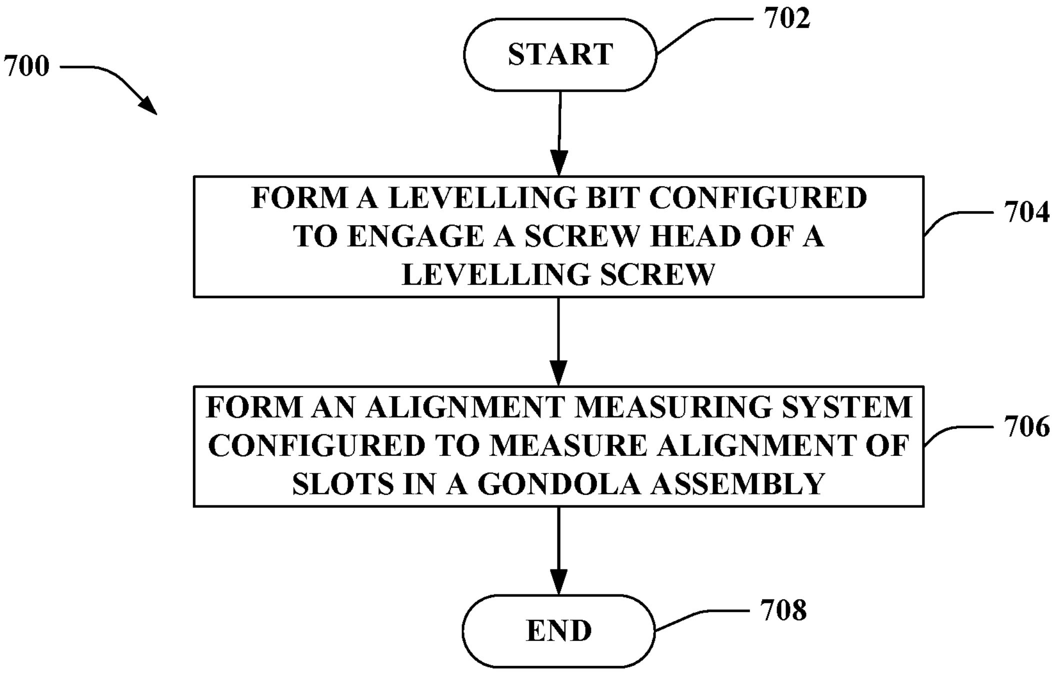
FIG. 7 is a flow diagram that illustrates an exemplary methodology for forming a levelling assembly for a gondola assembly.
Figure 8:
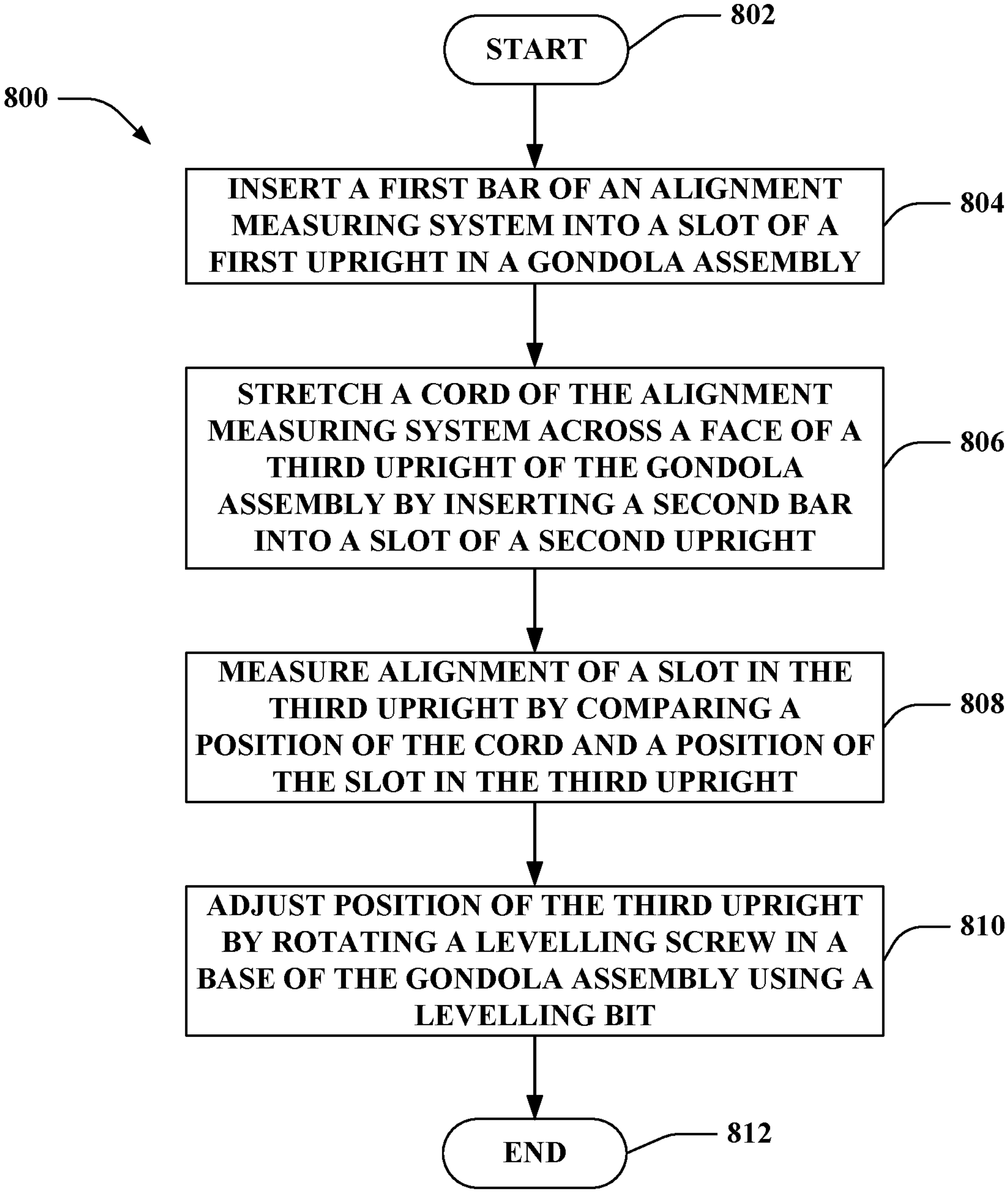
FIG. 8 is a flow diagram that illustrates an exemplary methodology for using a levelling assembly for a gondola assembly.

FIG. 7 illustrates an exemplary methodology of forming a levelling assembly for a gondola assembly. FIG. 8 illustrates an exemplary methodology relating to using a levelling assembly for a gondola assembly. While the methodologies are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

As illustrated in FIG. 7, a methodology 700 starts at 702, and at 704, a levelling bit configured to engage a screw head of a levelling screw is formed. Forming the levelling bit includes forming a first portion at a first end of the levelling bit to engage the screw head of the levelling screw head. Forming the levelling bit further includes forming a second portion at the first end of the levelling bit to countersink around a head of the levelling screw when the first portion engages the screw head. At 706, an alignment measuring system configured to measure alignment of slots in the gondola assembly is formed. Forming the alignment measuring system comprises securing a first bar on a retractable cord and movably securing a second bar on the retractable cord. The first bar is shaped for insertion into a first slot of a first upright bar of a first upright. The second bar is shaped for insertion into a second slot of a second upright bar of a second upright. The cord is shaped to extend along a face of a third upright located between the first upright and the second upright when the first bar is inserted into the first slot and the second bar is inserted into the second slot. The methodology 700 concludes at 708.

Turning now to FIG. 8, illustrated is a methodology 800 relating to using a levelling assembly for a gondola assembly. The methodology 800 starts at 802, and at 804, a first bar of an alignment measuring system is inserted into a slot of a first upright of the gondola assembly. At 806, a cord of the alignment measuring system is stretched across a face of third upright of the gondola assembly by inserting a second bar of the alignment measuring system into a slot of a second upright of the gondola assembly. The third upright is between the first upright and the second upright. At 808, alignment of a slot in the third upright compared to the slot in the first upright and the slot in the second upright is measured by comparing a position of the cord and a position of the slot in the third upright. At 810, a position of the slot in the third upright is adjusted by rotating a levelling screw in a base of the gondola assembly using a levelling bit attached to an extender that is attached to a drill. The levelling bit includes a first end that includes a first portion configured to engage a screw head of a levelling screw and a second portion configured to countersink around a portion of the leveling screw when the first portion engages the screw head. The methodology 800 concludes at 812.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A levelling assembly comprising:
- a levelling bit configured to engage a screw head of a levelling screw in a gondola assembly, wherein the levelling bit comprises:
  - a first portion at a first end of the levelling bit to engage the screw head of the levelling screw;
  - a second portion at the first end of the levelling bit to countersink around a portion of the levelling screw when the first portion engages the screw head; and
  - an attachment portion at a second end of the levelling bit for attachment to an extender for a drill, wherein the second end opposes the first end.

2. The levelling assembly of claim 1, wherein the levelling bit comprises a first section and a second section, wherein the first section comprises a first material, wherein the second section comprises a second material, wherein the first material and the second material are different.

3. The levelling assembly of claim 2, wherein the first section and the second section are attached to each other via crimping.

4. The levelling assembly of claim 3, wherein an end of the first section has a polygonal cross-section configured to engage a corresponding polygonal receiving end of the second section when the first section and the second section are attached to each other.

5. The levelling assembly of claim 1, wherein the first portion comprises an extension configured to engage a flathead screw head.

6. The levelling assembly of claim 1, further comprising a second levelling bit comprising a second end that includes a third portion configured to engage a screw head of a second levelling screw in the base of the gondola assembly, wherein the second end further includes a fourth portion configured to countersink around a portion of the second levelling screw when the third portion engages the screw head of the second levelling screw.

7. The levelling assembly of claim 1, further comprising an alignment measuring system configured to measure alignment of slots in the gondola assembly, wherein the alignment measuring system comprises a first bar attached to a retractable cord and a second bar movable along the retractable cord, wherein the first bar is shaped for insertion into a first slot of a first upright of the gondola assembly, wherein the second bar is shaped for insertion into a second slot of a second upright of the gondola assembly, wherein the cord is shaped to extend along a face of a third upright located between the first upright and the second upright when the first bar is inserted into the first slot and the second bar is inserted into the second slot.

8. The levelling assembly of claim 7, wherein a portion of the cord is retained in a chalk line tool.

9. The levelling assembly of claim 1, wherein a portion of the levelling bit comprises brass.

10. A levelling bit for use in connection with levelling a gondola assembly, the levelling bit comprising:
- engagement means for engaging a screw head of a levelling screw of the gondola assembly, the engagement means located at a first end of the levelling bit;
- countersink means for countersinking around a portion of the levelling screw when the engagement means engages the screw head, the countersink means located at the first end of the levelling bit; and
- attachment means for attaching the levelling bit to an extender for a drill, the attachment means located at a second end of the levelling bit, wherein the second end opposes the first end.

11. The levelling bit of claim 10, wherein the levelling bit comprises:
- a first section that comprises a first material; and
- a second section that comprises a second material, wherein the first material and the second material are different.

12. The leveling bit of claim 11, wherein the first section and the second section are attached to each other via crimping.

13. The leveling bit of claim 12, wherein an end of the first section has a polygonal cross-section configured to engage a corresponding polygonal receiving end of the second section when the first section and the second section are attached to each other.

14. The levelling bit of claim 10, wherein the engagement means comprises an extension configured to engage a flathead screw head of the levelling screw of the gondola assembly.

15. The levelling bit of claim 10, wherein at least one of the engagement means or the countersink means comprises brass.

16. A method for levelling a gondola assembly through use of a levelling bit, the method comprising:
- coupling the leveling bit to an extender for a drill, wherein the levelling bit comprises:
  - a first portion at a first end of the levelling bit to engage a screw head of a levelling screw of the gondola assembly;
  - a second portion at the first end of the levelling bit to countersink around a portion of the levelling screw when the first portion engages the screw head; and
  - an attachment portion at a second end of the levelling bit for attachment to an extender for a drill, wherein the second end opposes the first end;
- engaging the screw head of the levelling screw with first portion of the levelling bit; and
- activating the drill to rotate the levelling bit, thereby rotating the levelling screw of the gondola assembly.

17. The method of claim 16, wherein the levelling bit comprises:
- a first section that comprises a first material; and a second section that comprises a second material, wherein the first material and the second material are different.

18. The method of claim 17, wherein the first section and the second section are attached to each other via crimping.

19. The method of claim 17, wherein an end of the first section has a polygonal cross-section configured to engage a corresponding polygonal receiving end of the second section when the first section and the second section are attached to each other.

20. The method of claim 16, wherein the first portion of the levelling bit comprises an extension configured to engage a flathead screw head of the levelling screw of the gondola assembly.

* * * * *